June 1, 1937.  O. HACKER  2,081,996
RAIL VEHICLE
Filed March 28, 1933
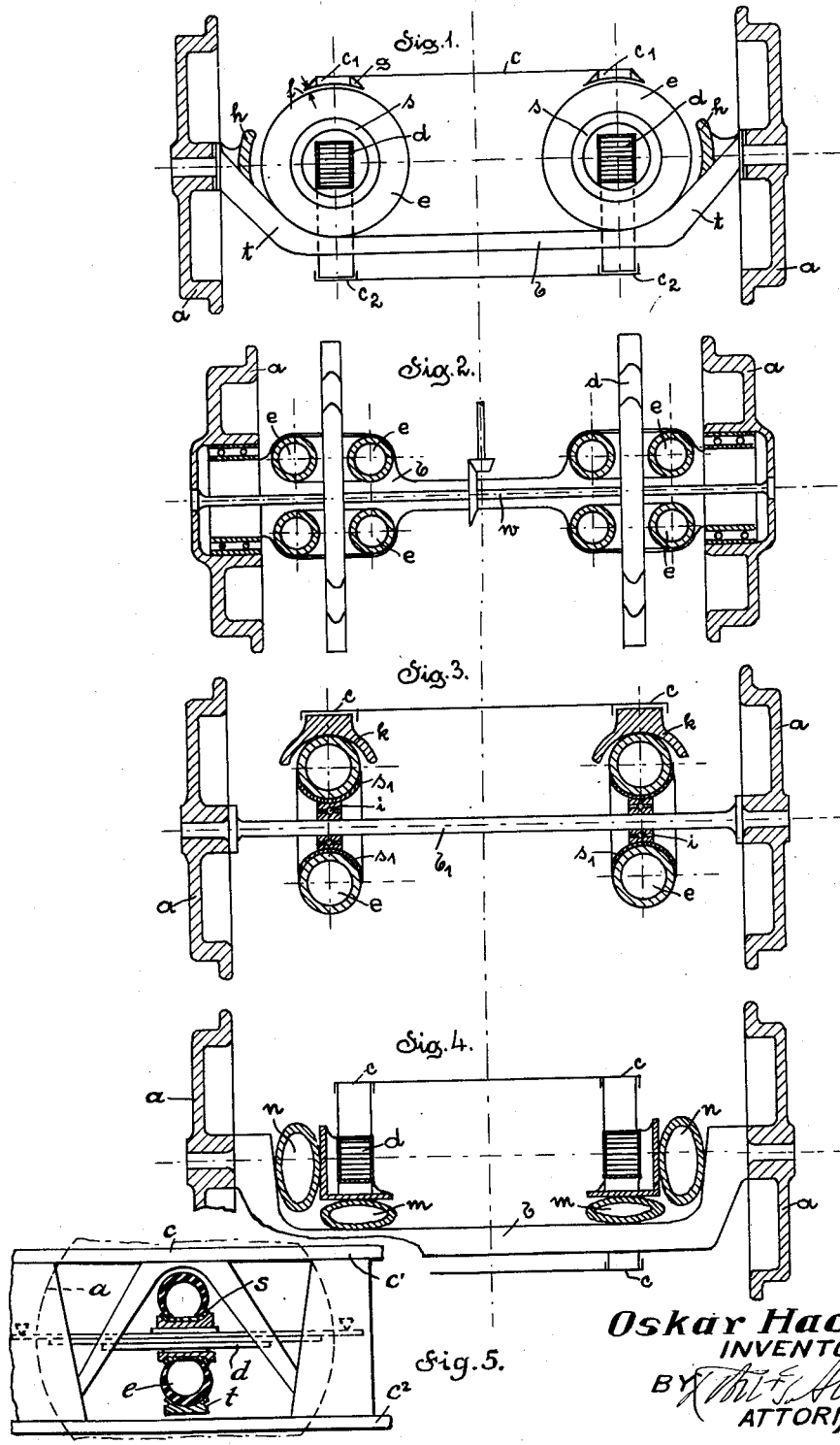
Oskar Hacker,
INVENTOR
BY
ATTORNEY Patented June 1, 1937

2,081,996

UNITED STATES PATENT OFFICE 2,081,996

RAIL VEHICLE

Oskar Hacker, Wiener-Neustadt, Austria, assignor to the firm Austro-Daimler-Puchwerke A-G., Wiener-Neustadt, Austria Application March 28, 1933, Serial No. 663,127
In Austria September 16, 1932

6 Claims. (Cl. 105—453)

This invention relates to a rail vehicle and consists more particularly in this, that the frame of the vehicle rests on pneumatic cushions in such a manner that the pneumatic cushions elastically transmit or damp not only vertical forces or vertical shocks from the rails, but also horizontal forces or horizontal shocks from the rails. A preferred constructional form is one in which the pneumatic cushion or cushions are made in the form of pneumatic tubes which are disposed between the wheel axle and the axle guiding means. The arrangement may be made such that the vehicle springs or axle springs coact through the intermediary of the pneumatic cushions or pneumatic tubes with the wheel axles or that the pneumatic cushions are disposed between the spring and the axle. By means of lateral stops which may be elastic for the pneumatic cushions or pneumatic tubes, the latter may easily be made capable of damping lateral or horizontal shocks. For damping lateral or horizontal shocks a constructional form is preferred in which the lateral stops are made in the form of an inclined plane or an inclined supporting surface for the pneumatic tube. Such a construction of the lateral stops as an inclined supporting surface has the advantage that the supporting surface may at the same time be formed as an inclined plane of such an inclination for the vertical motion of the air tube that on lateral shocks occurring and when negotiating curves, the pneumatic tube can move vertically on the inclined supporting surface, whereby the vehicle body is given an inward inclination in the curve or at least will be prevented from tending to incline outward.

In the accompanying drawing several constructional examples of the invention are shown diagrammatically, in which the pneumatic cushions are made in the form of pneumatic tubes.

Fig. 1 is a front view and partial vertical section of one form of construction involving my invention.

Fig. 2 is a plan view and partial section showing a modified form of my invention.

Fig. 3 is a vertical section showing another modification.

Fig. 4 is a vertical section showing another modification.

Fig. 5 is a side view and partial section showing the body and mounting of the leaf springs and indicating the position of the wheels of a form such as shown in Fig. 1.

In the constructional form shown in Fig. 1 the normal rail wheels $a$ are mounted on an axle $b$. The vehicle body $c$ is made in the form of a lattice girder with the top beam $c_1$ and the bottom beam $c_2$, the axle $b$ being disposed between the top beam and the bottom beam. The normal vehicle springs or supporting springs $d$ are disposed with their spring housings within a felloe $s$ for the pneumatic tube, which felloe supports the pneumatic tube $e$, the spring housing being preferably mounted so as to be capable of turning in the felloe, while however it can also be fixed therein.

The arrangement is such that the pneumatic tube transmits the weight of the vehicle in a similar manner as in road vehicles from the spring through the spring housing and through the pneumatic tube felloe to the suitably constructed axle.

For damping lateral shocks the axle $b$ is made trapezoidal in side elevation, the two limbs $t$ of the trapezoid forming a lateral guide for the vehicle frame for supporting the pneumatic tubes. The axle is suitably so constructed that these two limbs act as a supporting surface of such an inclination for the pneumatic tubes that the pneumatic tubes by travelling up them may experience a lifting motion.

This provides a further very important advantage. On centrifugal forces occurring in curves, which force the vehicle outwards, a small rolling motion of the outer pneumatic tubes against an inclined ascending part of the axle is produced, which causes a slight raising of the outer part of the frame and consequently an inward inclination of the vehicle body. When such an inward inclination is undesirable in cases where there is a considerable super-elevation of the rail in curves, the inclination of the inclined part of the axle is made such that in the outward rolling motion the increased compression of the outer tube supporting the greater load in the curve is only just compensated.

By suitably dimensioning the space $f$ between the upper part of the pneumatic tube and an extension $g$, a suitable limitation of the spring displacement can be obtained. If through overloading or through resonance vibrations the range of oscillation of the frame should become particularly great, the extension $g$ will bear directly on the pneumatic tube. By this means the play of the supporting spring $d$ is elastically limited.

The lateral motions of the vehicle frame with respect to the axle can of course be limited by suitable stops $h$.

Fig. 1 shows an example for undriven axles.

A constructional example for driven axles is shown in Fig. 2. In this example the driving axle extends in front of or behind the pneumatic cushions. For damping shocks preferably two pneumatic tubes e are provided both to the right of and the left of the driving axle w which is guided above or below the supporting springs d.

The constructional form shown in Fig. 1 could of course also be used for driven axles, in which case the wheels might be driven by chains or the like.

In the constructional example shown in Fig. 3 the wheels a are fixed rigidly on the rotating axle $b^1$ which runs in bearings i. The bearing housing is mounted in a pneumatic tube felloe $s_1$ which supports the pneumatic tube e. In the case of simple vehicles the vehicle frame c rests on the pneumatic tube with a suitably formed supporting plate k. This supporting plate is either straight in the longitudinal direction of the vehicle, whereby the loading conditions of a pneumatic tyre rolling on the road is exactly reproduced, or it may be curved so that the weight of the vehicle rests on a considerable curved portion of the pneumatic tube. This increases the deformation zone of the pneumatic tube and decreases the local stressing.

In the transverse direction the supporting plate k is made curved and rests around the profile (cross-section) of the pneumatic tube, so that the latter is capable through its lateral stiffness of taking up lateral forces, while it absorbs shocks through its lateral elasticity.

This provides the further advantage that shocks in the direction of travel due to acceleration and braking are also transmitted to the vehicle frame after being damped, if the supporting plate does not bear flat on the tube, but bears along a definite curve in the direction of travel.

A further constructional example is shown in Fig. 4. This arrangement is in principle the same as that shown in Fig. 1, the difference being that separate means are provided for taking up the horizontal and vertical forces.

For this purpose two rubber or pneumatic cushions m, n are provided at either side, the frame c resting through the intermediary of the usual vehicle springs d on the pneumatic cushions m which transmit the load of the vehicle to the axle b and to the wheels a. The pneumatic or rubber cushions n act as guides in the lateral direction and absorb shocks which occur in travelling round curves and other points.

The arrangement may be such that when travelling round curves, the above described lifting effect is also realized. This can be effected by suitably dimensioning the size of the pneumatic cushions and by a suitable horizontal connection between the lateral guiding cushions and the supporting cushions of either side. On the occurrence of heavy lateral shocks or strong centrifugal forces in a curve, a pressure will be produced in the lateral cushions which will be propagated through the hose connection into the supporting cushion where it can produce a lifting motion.

With supporting cushions of a suitably large size the usual supporting springs may be entirely omitted.

In high quality vehicles the reaction forces occurring in the axles, due to the application of the brakes or to the drive, are taken up in a suitable manner by torque supports and push beams or similar arrangements.

The arrangement with pneumatic tubes which embrace the bearing casing concentrically on the running axle (Fig. 3) can also be constructed without torque supports and push beams if the supporting plate be arched in the longitudinal direction of the vehicle and the arch being of such a length that it embraces about 180° of the tube, thus being suitable for transmitting longitudinal forces.

By making the internal radius of the supporting plate greater than the radius of the pneumatic tube the latter is given the necessary freedom of play for allowing for the deformation.

This arrangement has the advantage that the vehicle frame and consequently the vehicle body is completely insulated from the chassis both mechanically and acoustically so that not only shocks are prevented from being transmitted to the frame but also any transmission of noise due to the shocks into the interior of the vehicle is prevented.

What I claim is:

1. A rail vehicle comprising a frame, pneumatic cushions for supporting the said frame, which cushions are adapted elastically to transmit and damp both forces due to vertical shocks and forces due to horizontal shocks, and wheel axles supporting said cushions and having cranked parts forming lateral stops for engagement with the pneumatic cushions enabling the pneumatic cushions to take up lateral or horizontal forces or shocks, as and for the purpose set forth.

2. A rail vehicle comprising a frame, pneumatic cushions for supporting the said frame, said cushions being adapted elastically to transmit and damp both forces due to vertical shocks and forces due to horizontal shocks, and wheel axles supporting said cushions and having cranked parts in the form of inclined planes and forming lateral stops for the pneumatic cushions enabling the pneumatic cushions to take up lateral or horizontal forces or shocks, as and for the purpose set forth.

3. A rail vehicle comprising in combination, wheels and a connecting axle therebetween on which said wheels are mounted, a vehicle frame, a resilient pneumatic cushion supporting the frame and on which shocks between the frame and axle are adapted to be absorbed and a lateral stop carried by said axle for cooperation with said cushion, said stop having an inclined surface of such inclination that upon occurrence of lateral thrusts and upon rounding curves the cushion may ride up the inclined surface and oppose the tendency of the vehicle to incline outwardly, said cushion being of generally circular shape and adapted to rotate about its axis in riding up said inclined surface.

4. A rail vehicle comprising in combination, wheels and a connecting axle therebetween on which said wheels are mounted, a vehicle frame, a resilient pneumatic cushion supporting the frame and on which shocks between the frame and axle are adapted to be absorbed and a lateral stop carried by said axle for cooperation with said cushion, said stop having an inclined surface of such inclination that upon occurrence of lateral thrusts and upon rounding curves the cushion may ride up the inclined surface and oppose the tendency of the vehicle to incline outwardly, said inclined surface being constituted by a portion of the wheel axle and said axle being non-rotatable.

5. A rail vehicle comprising in combination, wheels and a connecting axle therebetween on which said wheels are mounted, a vehicle frame, a resilient pneumatic cushion supporting the frame and on which shocks between the frame and axle are adapted to be absorbed and a lateral stop carried by said axle for cooperation with said cushion, said stop having an inclined surface of such inclination that upon occurrence of lateral thrusts and upon rounding curves the cushion may ride up the inclined surface and oppose the tendency of the vehicle to incline outwardly, said cushion being supported by a spring in a position ready to ride up said inclined surface.

6. A rail vehicle comprising a frame, a body, springs connected to said frame for supporting the body, wheel axles to which said springs are indirectly connected, said connection comprising pneumatic tubes cooperating with said wheel axles elastically to transmit and damp both forces due to vertical shocks and forces due to horizontal shocks and hollow rims carried by said tubes, the springs being disposed within the said hollow rims, as and for the purpose set forth.

OSKAR HACKER.